United States Patent [19]

Reuther et al.

[11] 4,349,744
[45] Sep. 14, 1982

[54] SYSTEM FOR OPERATING MULTIPLE GAS TURBINES FOR COORDINATED DEAD LOAD PICKUP

[75] Inventors: John F. Reuther, Penn Hills Township, Allegheny County; Stephen J. Jennings, Radnor Township, Delaware County; Robert A. Yannone, Aldan, all of Pa.

[73] Assignee: Westinghouse Electric Corp., Pittsburgh, Pa.

[21] Appl. No.: 142,520

[22] Filed: Apr. 21, 1980

Related U.S. Application Data

[63] Continuation of Ser. No. 703,737, Jul. 9, 1976.

[51] Int. Cl.³ .......................... H02J 3/08; H02P 9/04
[52] U.S. Cl. .................................. 290/40 C; 307/87; 307/129
[58] Field of Search ...................... 290/40, 30 R, 30 A, 290/30 B; 307/85-87, 125-131, 153

[56] References Cited

U.S. PATENT DOCUMENTS

| | | | |
|---|---|---|---|
| 3,235,743 | 2/1966 | Ryerson et al. | 290/30 R |
| 3,620,010 | 11/1971 | Davis | 60/39.15 |
| 3,646,356 | 2/1972 | Hoffman | 307/87 |
| 3,811,273 | 5/1974 | Martin | 60/39.15 |

FOREIGN PATENT DOCUMENTS 722513  1/1955  United Kingdom ............... 60/39.15

OTHER PUBLICATIONS

Maekawa: University Lectures, Lectures in Power Transmission Engineering (last volume); 1970; (pp. 211–212).

*Primary Examiner*—Shelley Wade
*Attorney, Agent, or Firm*—E. F. Possessky

[57] ABSTRACT

Two gas turbine power plants are started and accelerated by fuel controls on selection of dead load mode. The startup is coordinated so that one turbine-generator is controlled as the lead unit and it is driven to a speed higher than normal, short of overspeed condition at which time its breaker is closed on an auxiliary bus. Shortly thereafter the second turbine-generator is synchronized to the first and its generator breaker is closed to the auxiliary bus. The two units are then ready for a simultaneous 200% load pickup from the dead load bus. After the load is applied, the lead unit is placed under isochronous control and the follow unit is tracked to the lead unit. Turbine lead/follow roles can be reversed during startup under certain conditions, and predetermined data is exchanged between the controls to enable coordinated dead load pickup operation.

12 Claims, 13 Drawing Figures

NOTE: DI4RI IS SPEED REFERENCE READ FROM OTHER COMPUTER

PUMP DISCHARGE, THROTTLE VALVE POSITION, CSO & NOZZLE PRESS. vs TIME

EXHAUST & BLADE PATH TEMP. vs TIME

SYSTEM FOR OPERATING MULTIPLE GAS TURBINES FOR COORDINATED DEAD LOAD PICKUP

This is a continuation of application Ser. No. 703,737, filed July 9, 1976.

CROSS REFERENCE TO RELATED APPLICATIONS

Ser. No. 319,114 hereby incorporated by reference, entitled *IMPROVED SYSTEM AND METHOD FOR OPERATING INDUSTRIAL GAS TURBINE APPARATUS AND GAS TURBINE ELECTRIC POWER PLANTS PREFERABLY WITH A DIGITAL COMPUTER CONTROL SYSTEM,* filed by T. Giras et al. on Dec. 29, 1972 as a continuation of an earlier filed application, and directed to a gas turbine power plant having a basic control system usable in implementing the present invention.

BACKGROUND OF THE INVENTION

The present invention relates to gas turbine power plants and, more particularly, to such plants which are arranged for dead load pickup.

In various areas of a power system, it may be desirable to provide a local generating plant to produce power for the area in the event the area becomes isolated from the rest of the system by a transmission line outage. In this way, the health and safety and convenience needs of the people served by the power system area can be reasonably met during the outage. Similarly, many large industrial plants such as metal processing plants have a need for local replacement generation in the event of a loss of the external power supply to such plants. Even steam power generating plants have a need for replacement power to operate auxiliary equipment during black plant starts after a shutdown of the steam turbine-generator equipment.

When an outage occurs, a plant which is to be brought on line to replace the lost generation often must be controlled to accept a dead load, i.e. in a power system a load already connected to the lines made dead by the transmission line outage. Gas turbine power plants are well-suited to providing replacement power because they can be started rapidly and they can provide relatively large amounts of power for replacement purposes for a part of the power system.

Residential dead load pickup by single gas turbine power plants has been performed previously in 1972 at the VEPCO Kitty Hawk plant in North Carolina. In such plant starts, the gas turbine control is triggered to accelerate the turbine to a speed above synchronous speed and the generator breaker is closed to connect the dead area load to the generator. The load placed on the turbine causes the turbine speed to droop to near the synchronous speed value, and the turbine speed control enters an isochronous mode to meet the load demand and hold the bus to the desired operating frequency, i.e. 60 Hertz.

If multiple gas turbines are to be started for dead load pickup in the same area, it is desirable that they be operated in a coordinated way during the startup and load modes of operation. Further, simultaneous synchronization of two or more generators must be avoided since it can cause damage if the generator breakers close when the associated generators are not matched in voltage magnitude, frequency or phase.

No known prior art publications and no known prior art power plants have included structure directed to this purpose. The Kitty Hawk plant has included a design capability for coordinated multi-unit dead load pickup by two gas turbine power plants and some descriptive information has been provided to the customer. However, the installed coordinated dead load pickup system has had an experimental status, i.e. there has been only a few days in each year during which the dead load pickup system can be scheduled for testing and as of the Fall of 1975 parts of the system such as acceleration to 108% speed, certain logic controls, the isochronous control and load rate limiting action have been verified in single unit starts and dead load pickup but the coordinated system for multiple unit starts and dead load pickup had not been properly operated nor accepted by the customer. On July 17, 1973, the two units were operated in the load mode together on an experimental basis, but the first unit was synchronized and moved to a load of 5 MW before the second unit was synchronized to the first unit. Thereafter, the two units shared an 8 MW load for about 15 minutes and because of load variance on the second unit and inability to synchronize to the tie line, the two units were shut down and the experiment was ended. Description of the prior art herein is presented in good faith and no representation is made that it is the best prior art not that interpretations placed on it are unrebuttable.

SUMMARY OF THE INVENTION

A system for supplying a dead load bus comprises at least two gas turbine-generator units and associated generator breakers and fuel control means. Means are provided for operating the fuel control means and the breakers to coordinate the turbine startups and the breaker closures.

DESCRIPTION OF THE PREFERRED EMBODIMENT

Figure 1:
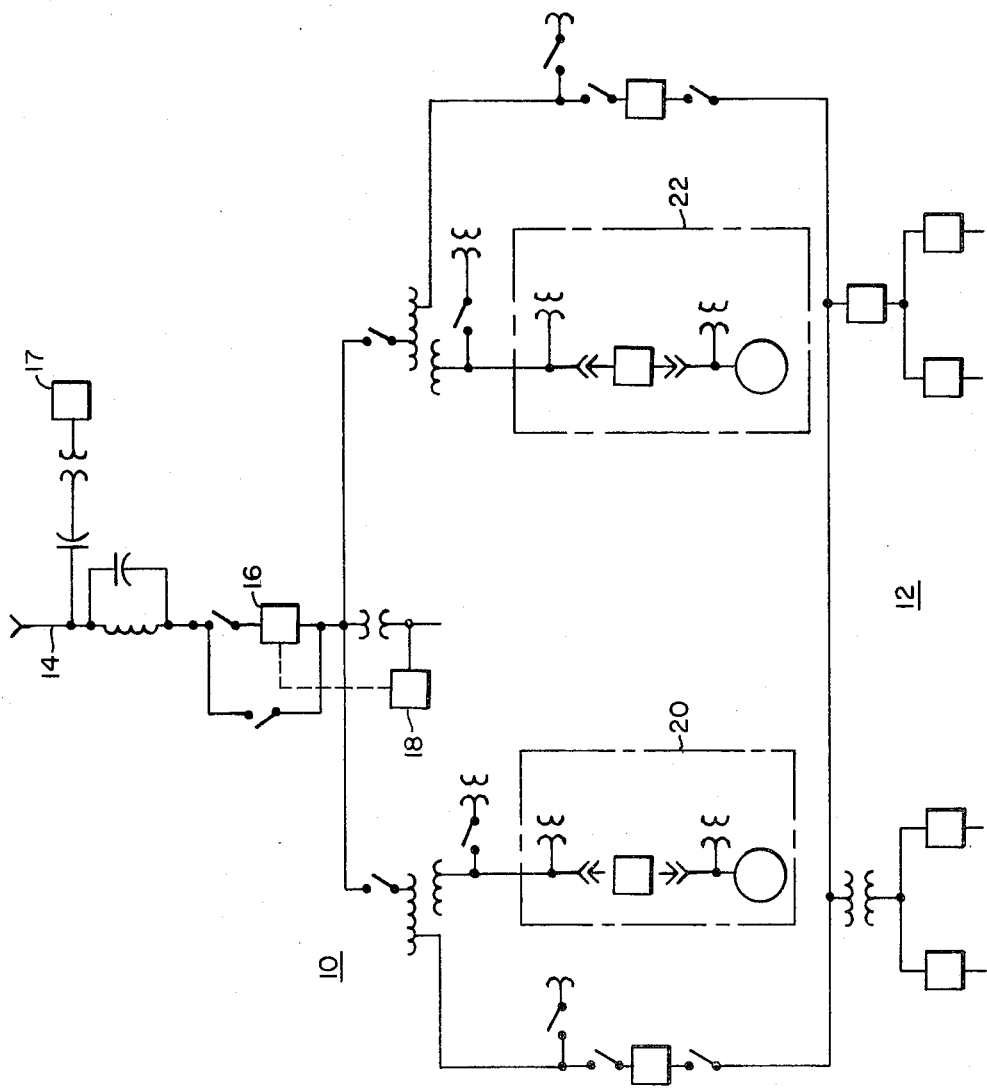
FIG. 1 shows a one line schematic diagram of a portion of a power system.

More specifically, there is shown in FIG. 1 a portion 12 of a power system 10 for which dead load pickup is to be provided in the event of an outage of line 14 and opening of the associated line breaker 16. A dead bus relay 18 senses a loss of voltage on the high voltage bus, and if the line breaker 16 is open generates a signal for automatic actuation of a pair of gas turbine generators 20 and 22 in an emergency power plant. Relays 17 trip the line breaker 16 on loss of line voltage.

As shown in FIG. 1, the local load to be supplied includes Kitty Hawk estimated to be 4 to 10 MVA and Nags Head/Manteo/Hatteras estimated to be 7 to 16 MVA. If desired, line switches can be operated to sectionalize the system load after a line outage and thereby reduce the dead load for pickup.

Figure 2:
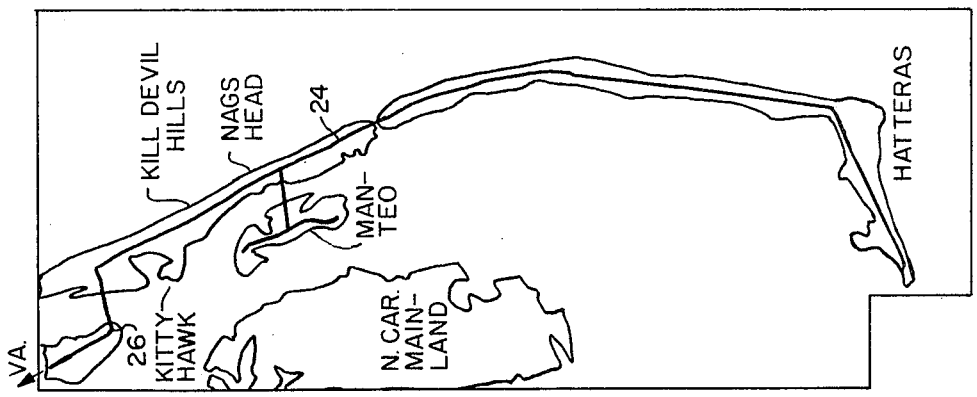
FIG. 2 shows a map of the area supplied by the power system portion shown in FIG. 1.

In FIG. 2, there is shown a map of the area corresponding to the load shown in FIG. 1. It is known as the Outer Banks area of North Carolina, and electric power is provided to this area by the Virginia Electric Power Company. Power is transmitted along a power line 24, and a section 26 of the line 24 is particularly susceptible to outages because of its bay location. The load is essentially residential in character, i.e. a significant portion of the load is motors for refrigerators, air-conditioners, freezers, etc. Accordingly, the load transient during a dead load pickup is typically about 2.5 times the normal running load. The load transient depends in part on how long the lines have been dead since, with increasing dead time, automatic temperature controls will cause more and more compressors to be turned on when power is restored. For the particular service area shown in FIG. 1, it is estimated that the load increases about 25% within 25 minutes after an outage, and it is therefore desirable that the turbines be put on line within their startup times, i.e. within about 10 minutes.

Figure 3:
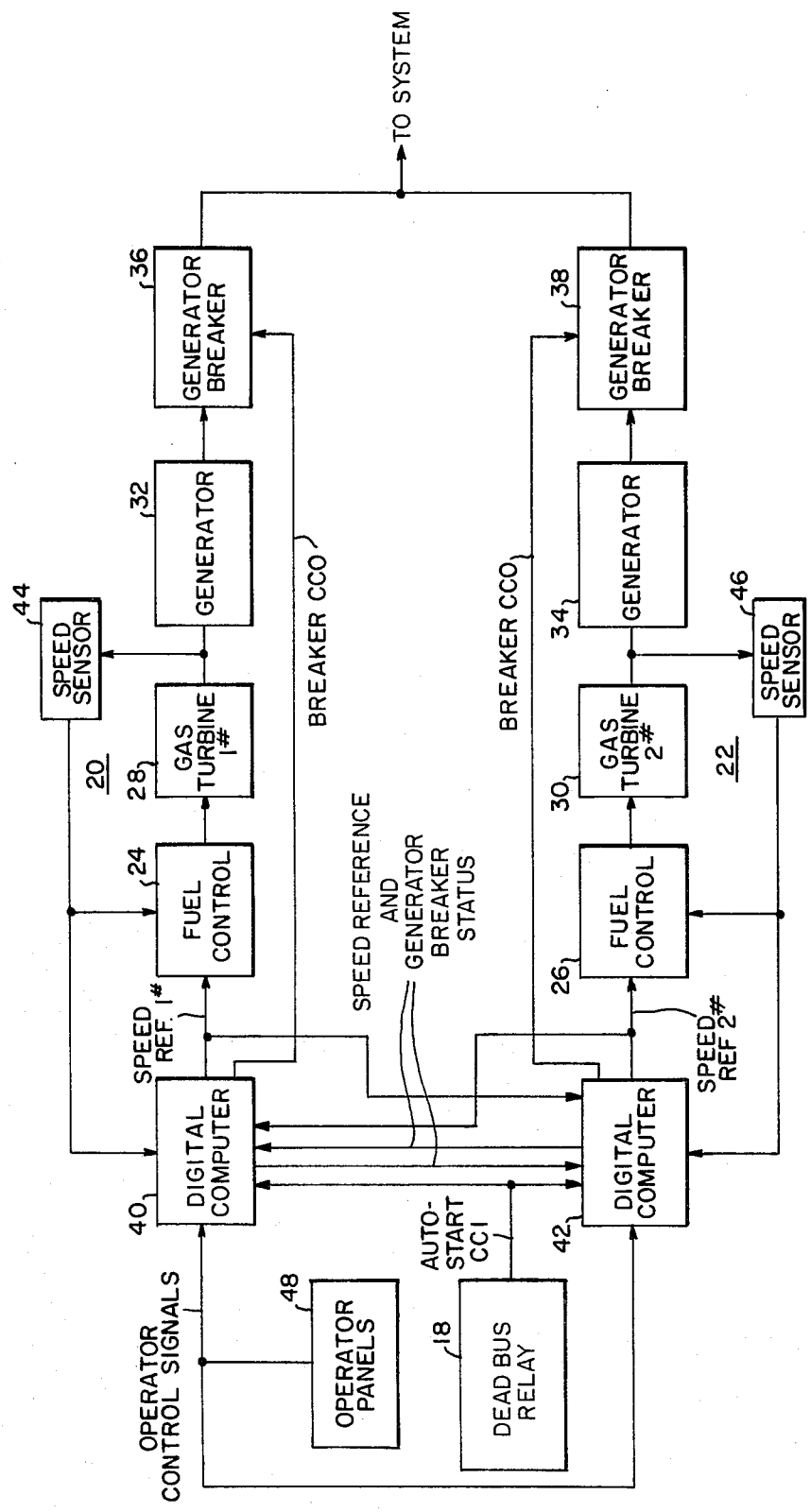
FIG. 3 shows a schematic diagram of a dead load pickup plant arranged in accordance with the present invention.

In FIG. 3 there is shown a more detailed schematic diagram of the gas turbine power plants 20 and 22. Although other kinds of controls can be used in embodying the invention in the gas turbine power plants, there is in the present case employed the computer control described in detail in the aforementioned patent application, Ser. No. 319,114. Generally, respective electropneumatic fuel controls 24 and 26 vary the fuel flows to gas turbines 28 and 30 to control the turbine speed during startup and synchronization and the turbine speed and load during load operation. The turbines 28 and 30 drive respective generators 32 and 34 which are connected to the Outer Banks load through breakers 36 and 38 (see also FIG. 1).

Although a single computer system can be employed, each power plant is provided in this instance with a digital control computer system 40 or 42 which apply respective speed reference signals to the fuel controls 24 and 26. Respective speed sensors 44 and 46 generate actual turbine speed signals which are respectively applied to the fuel controls 24 and 26 in respective feedback control loops. Turbine speed errors are corrected by the controls 24 and 26 which make changes in the turbine fuel flows.

Operator panels 48 are provided for operator control and monitoring. The panels include manual start and mode select buttons which are coupled to the computers 40 and 42 through contact closure inputs. The dead bus relay 18 is also coupled to the computers 40 and 42 for automatic dead load pickup operation.

Each computer 40 or 42 includes a speed reference generator and surge and temperature limit control loops which normally place no constraint on the functioning of the speed reference generator. Each computer also includes logic controls related to mode selection and the coordination of the startup of the two turbines during a dead load pickup. Generally, one turbine-generator is made the lead unit and it is designated as the preferred unit. However, under certain startup conditions detected by the computers, the lead can be shifted to the other turbine-generator and possibly back to the preferred unit.

Once the lead turbine-generator has reached the desired speed and its breaker 36 or 38 has been closed, the other turbine-generator is synchronized to the line with closure of its breaker 38 or 36. Thereafter, the lead turbine is operated by an isochronous control in its computer 40 or 42, i.e. a speed reference of about 105% rated speed is generated to hold the lead turbine at approximately 100% rated speed. The follow turbine computer tracks the lead computer speed reference in controlling the follow turbine-generator. The speed reference and the generator breaker status values are exchanged between the computers 40 and 42 for coordination purposes as shown in FIG. 3.

Figure 4:
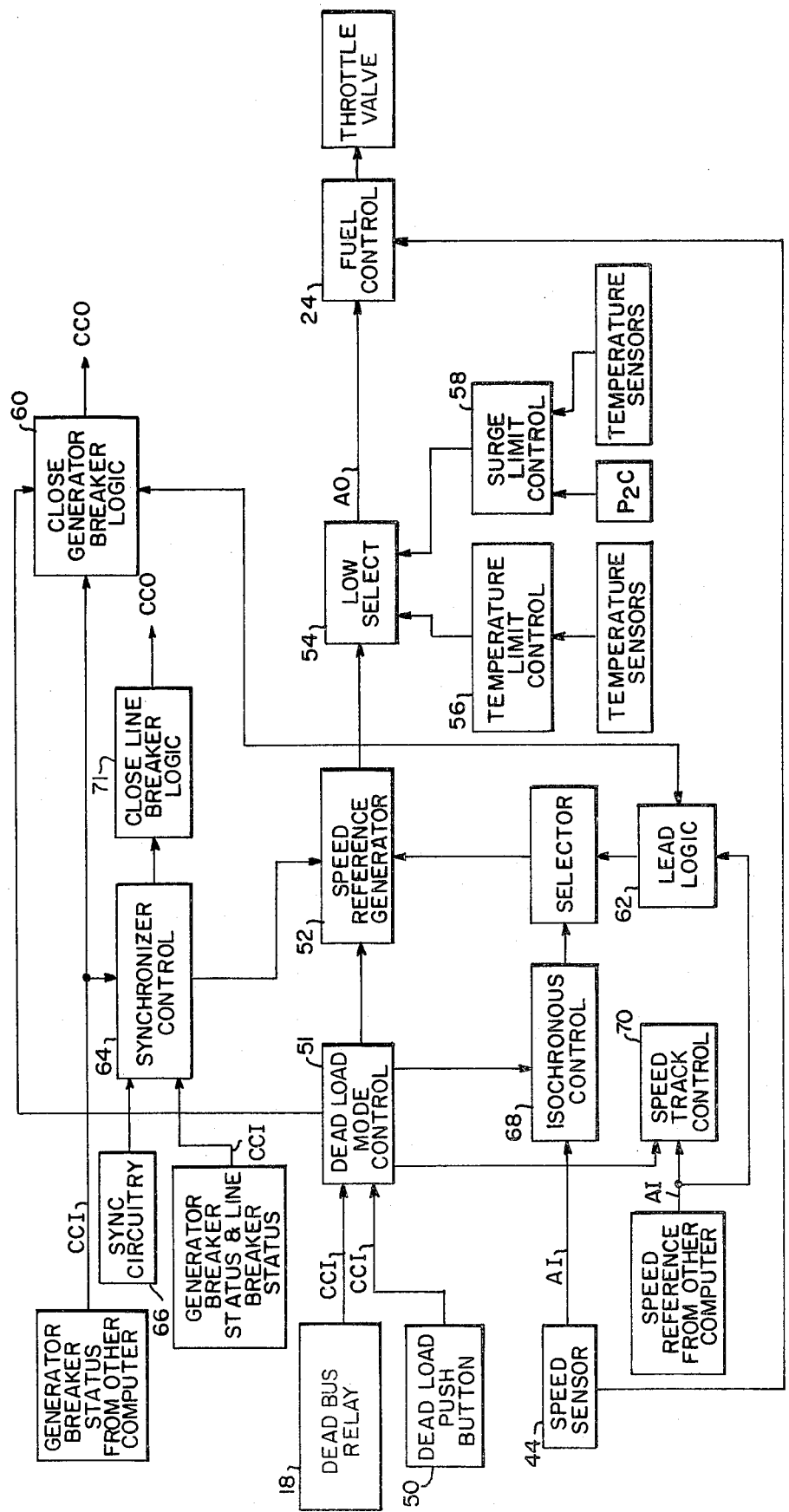
FIG. 4 shows a more detailed functional block diagram for a dead load pickup system employed in the plant of FIG. 3.

More specifically, as shown for the preferred turbine-generator unit 20 in FIG. 4, a dead load start is automatically initiated in the dead load pickup system by the relay 18 or by another trigger device such as an underfrequency relay (not shown) or manually by a panel pushbutton 50 after the upstream line breaker 16 opens. An arrangement like that shown in FIG. 4 is also provided for the nonpreferred turbine-generator unit 22 and accordingly it is not shown and will not be described except to the extent necessary to explain the total system operation.

A dead load mode control 51 in the control system for the turbine-generator unit 20 responds to the call for a dead load pickup and, after sequencing of auxiliaries and ignition, causes a speed reference generator 52 to generate a speed reference which increases under program control to a predetermined level, in this case 110% rated speed. Thus, the turbine is cranked, fired and accelerated to an overspeed condition with sufficient inertia to take up the initial load transient on dead load pickup.

The speed sensor 44 for the preferred turbine-generator unit 20 is connected to the fuel control 24 which develops an electrical speed error signal from the speed reference and the actual speed signals. A pneumatic signal is derived from the speed error signal to move the throttle valve and change the fuel flow and correct the turbine speed.

Figure 5:
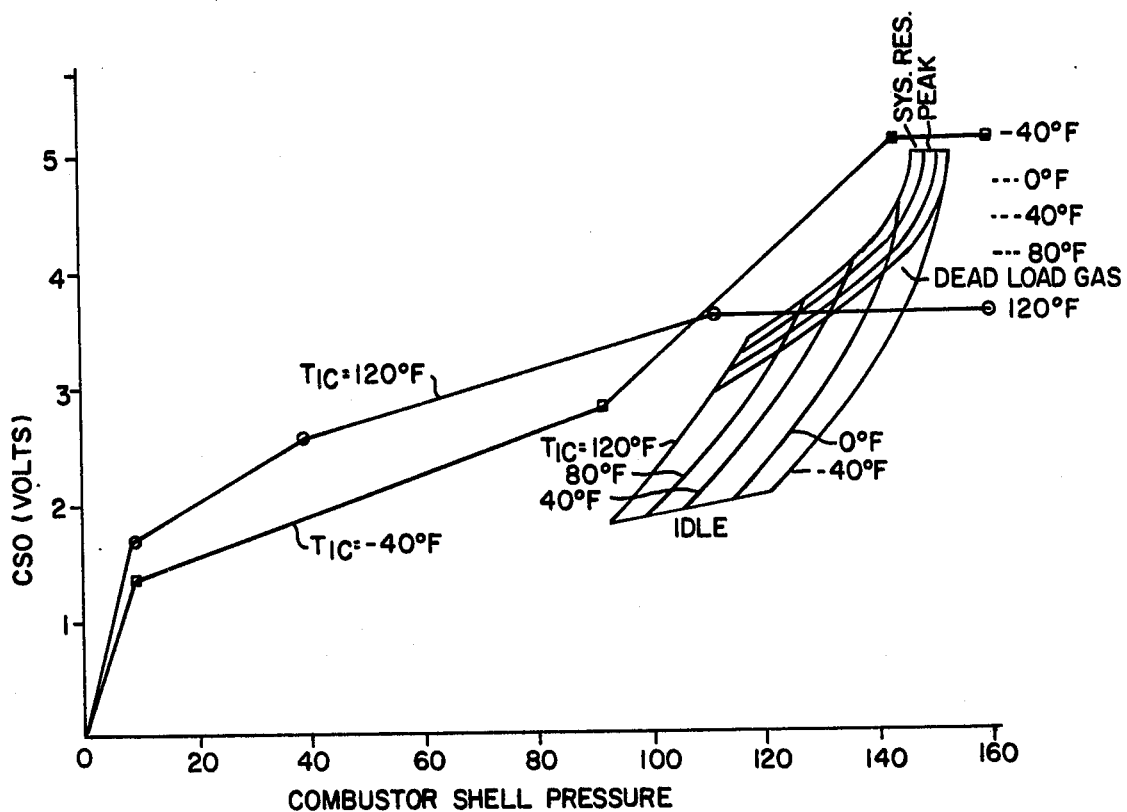
FIG. 5 shows a special surge limit characteristic employed in the system of FIG. 4.

A low selector 54 normally passes the speed reference to the fuel control 24, but the low selector output can be limited by a temperature limit control 56 or a surge limit control 58 under abnormal operating conditions. To allow for the initial dead load transient on dead load pickup, a special surge characteristic is employed in the surge limit control 58 as shown in FIG. 5. Thus, at 92% rated speed, the generator field breaker is closed and the special surge curve then is operative to limit fuel on the load transient as a function of compressor air inlet temperature so that the surge limit applied to the low selector 54 allows the expected sudden fuel increase when the load transient occurs.

If limit control action becomes operative temporarily during startup, the startup time period simply becomes extended. Limit control action after dead load pickup causes a drop in bus frequency. Preferably, load rate limit action which is otherwise applied to limit the rate at which the computer is allowed to load the turbine is disabled so that a step fuel increase can occur when the dead load is applied.

When 107% speed is reached, the generator breaker 36 is automatically closed by a logic control 60 if a lead logic control 62 indicates the preferred turbine-generator 20 and its computer 40 have the lead and if a predetermined generated voltage magnitude condition is satisfied. After closure of the generator breaker 36 and on closure of breaker 37 where the dead load is within the capacity of one turbine-generator unit, dead load pickup results in a load transient after which the speed reference is dropped to 106% rated speed and the turbine generator speed drops toward 100% rated speed. Load may thus be picked up to the limit of turbine base load capability.

Through the exchange of generator breaker status signals between the two control computers dangerous simultaneous generator breaker closings are avoided where both turbine-generators are needed to pick up the dead load.

When the load exceeds the capacity of one turbine-generator unit, the turbine-generator unit 22 also responds to a call for a dead load pickup and its speed reference generator in the computer 42 causes the turbine speed to run up to 107% as the turbine-generator 20 is being run up to the same speed. As shown in the logic diagrams of FIGS. 6A and 6B, the lead logic control 62 for the preferred unit and the corresponding lead logic control for the nonpreferred unit function as part of a dead load pickup coordination system and enable the preferred computer 40 to retain the lead if its turbine speed reference reaches 80% rated speed first and thereafter the non-preferred computer 42 is disabled from closing its generator breaker 38 onto the dead power plant auxiliary bus. On the other hand, if the speed reference for non-preferred unit reaches 80% rated speed first, its computer 42 is assigned the lead and the computer 40 is disabled from closing its generator breaker 36 onto the dead power plant auxiliary bus. The logic also causes a return of priority to the preferred machine after the nonpreferred machine takes the lead and fails to reach the target speed at which its breaker is to be closed on the dead auxiliary bus or after the non-preferred machine has its breaker closed and the preferred machine is later synchronized to the auxiliary bus.

The lead unit controls the system breakers 37 and 39 for dual load pickup onto the auxiliary bus and further controls the system frequency under isochronous operation. The priority machine can control the line breaker 16, it takes control of resynchronizing to a live bus in the event the line breaker 16 trips while the machines 20 and 22 are operating into the whole system 10. Speed references and breaker status signals are exchanged between the computers to enable the coordination system to establish priorities and designate the lead unit under changing conditions. The follow unit closes onto auxiliary bus, i.e., it must be synchronized to the lead unit after the lead unit generator breaker has been closed on the auxiliary bus. Further, the follow unit tracks the lead unit speed reference when both systems breakers 37 and 39 are closed on dead load pickup operation and the line breaker 16 has not been closed.

Immediately after the lead unit has been closed onto the auxiliary bus, the follow unit senses the closure of the breaker 36 and it is automatically synchronized to the lead unit, i.e. while the two units are both at about 108% rated speed and before the load transients is applied by closure of system breakers 37 and 39 onto dead load line 49 (FIG. 1) to cause a turbine speed drop.

For the purpose of synchronizing the generator breaker 38, a synchronizer control in the computer 42 responds to external synchronizer circuitry and operates the speed reference generator to match the frequency, phase and voltage magnitude of the follow turbine-generator with that of the lead turbine-generator. In the lead computer, a corresponding synchronizer control 64 responds to external synchronizer circuitry 66 and operates the speed reference generator 52 to synchronize the breaker 36 to the bus when the computer 40 acquires a follow role assignment. A CCO is generated for closure of the follow generator breaker when match conditions are achieved.

If the power system load pickup is in excess of one machine capacity, the load can be sectionalized by breakers to provide assurance that one machine will not be overloaded in the event the second machine fails to respond. For example, a part of the total load might be designated as initial dead load on the bus 49, and after the two systems breakers 37 and 39 are closed the remaining parts of the load can be sequenced onto the bus in a predetermined order. Thus, in the system shown in FIG. 1, the Kitty Hawk breakers 41 and 43 and the Nags Head breakers 45 and 47 could be closed after respective time delays of 15 seconds, 60 seconds and 135 seconds.

Preferably, an isochronous control 68 for the lead turbine-generator becomes operative 6 minutes after closure of the breaker 37 on the dead load bus 49, and at that time and each minute thereafter causes a corrected speed reference to be generated to hold the turbine-generator speed at 100% rated speed plus or minus 0.2% adjustable to plus or minus 0.1%. In providing isochronous control, the block 68 compares actual turbine speed to the setpoint of 100% rated speed and generates a correction signal every minute. The corrected speed reference output causes the fuel control 24 to change the lead turbine fuel flow to a value which provides a correct actual turbine speed within the allowed tolerances.

After the breaker 38 is closed to the auxiliary bus, the follow computer 42 uses a speed track control 70 to track the speed reference from the lead computer 40 and matches the speed reference output from the follow computer 42 to that of the lead computer 40. When the isochronous control phase of operation is reached, the lead computer 40 accordingly provides control over the generation frequency of the two generators by controlling the lead turbine speed with follow speed control action being provided for the follow turbine by the follow computer 42. If the nonpreferred computer 42 is the lead computer, a speed track control 70 in the preferred and follow computer may cause similar but reverse action to occur, but in this situation it is highly probable that the preferred unit has failed to respond and has been shut down.

If synchronization is unsuccessful for the second generator breaker, a three-minute time delay is initiated to allow new synchronization attempts while putting a hold on loading. After the time delayed resynchronization effort, the loading sequence can be started by the system operator for the operating turbine-generator unit(s) but the amount of applied load should be limited to the capability of the connected turbine-generator unit if the synchronization attempts for the second breaker have failed. On final synchronization failure, the second unit is preferably shut down.

If both machines respond to a start signal and successfully load and the lead machine trips for some reason, the priorities are computer-checked and the computer associated with the turbine having its speed reference above 80% rated speed is assigned the lead machine priority. In the event either machine shuts down, the control logic preferably includes a single try logic function which prevents repetitive starting.

If desired after dead load pickup operation, the turbine generators can be released from dead load mode follow operation by a panel selector. In that event, the nonpreferred turbine can be operated at a preselected load level such as minimum load and the lead computer operates under isochronous control to take system load swings.

On an automatic start, base load normal start is selected. While in the dead load mode, use of a MIN LOAD pushbutton provided for normal operations is blocked. This is because it uses load control and on an isolated system fuel changes cause speed changes rather than load changes.

If the line breaker 16 trips while the plant is functioning in a normal load mode and specifically while the turbines are on MIN LOAD, the resulting load may be less than the kilowatt reference in which case the unit goes toward 104% speed, or the load may be greater than the kilowatt reference in which case the turbine may trip on underspeed. Therefore, before selecting the dead load mode, the operator should check that the line breaker is open and that MIN LOAD is not selected. Otherwise, the dead load mode can be selected as desired including during acceleration, holding at synchronous speed with the generator breaker open and after the line breaker opens while running to activate isochronous control.

Should the auxiliary bus become hot after the dead load mode is triggered, the turbine will accelerate to 107% speed and the automatic synchronizer will bring it back down and synchronize it with the bus. When the generator breaker closes, the load rate limiter is out of service so that, if base load is selected, the unit quickly goes to base load as the speed reference is raised to 110%. Since the frequency should be within the deadband, the isochronous control makes no corrections assuming a well-calibrated speed measuring system. This type of operation should be avoided and the operator should push the dead load button to cancel the dead load pickup mode at the first opportunity.

Since either or both machines may be called upon to supply dead load service, each must be capable of synchronizing the line breaker for return to normal line service when the reason for the line outage has been cleared. When the operator decides to synchronize the line breaker 16 and both machines are operating, a pushbutton selection is made for automatic line breaker synchronization for the preferred turbine. Otherwise the operating turbine is selected.

To synchronize, the speed reference of the preferred turbine is controlled to cause matching of speed, voltage, and phase of the local generator(s) to those of the main power line. When matching occurs, a CCO is put out to close the line breaker 16 automatically.

In FIGS. 6A–6E and 7 there are shown more detailed logic diagrams for various logic controls employed in the system. Thus, block 50 of FIG. 4 is further detailed in part of FIG. 6A. This shows that the dead load pushbutton is active only in local control (43L) and that it is programmed to act as an alternate action pushbutton.

Figure 6A:
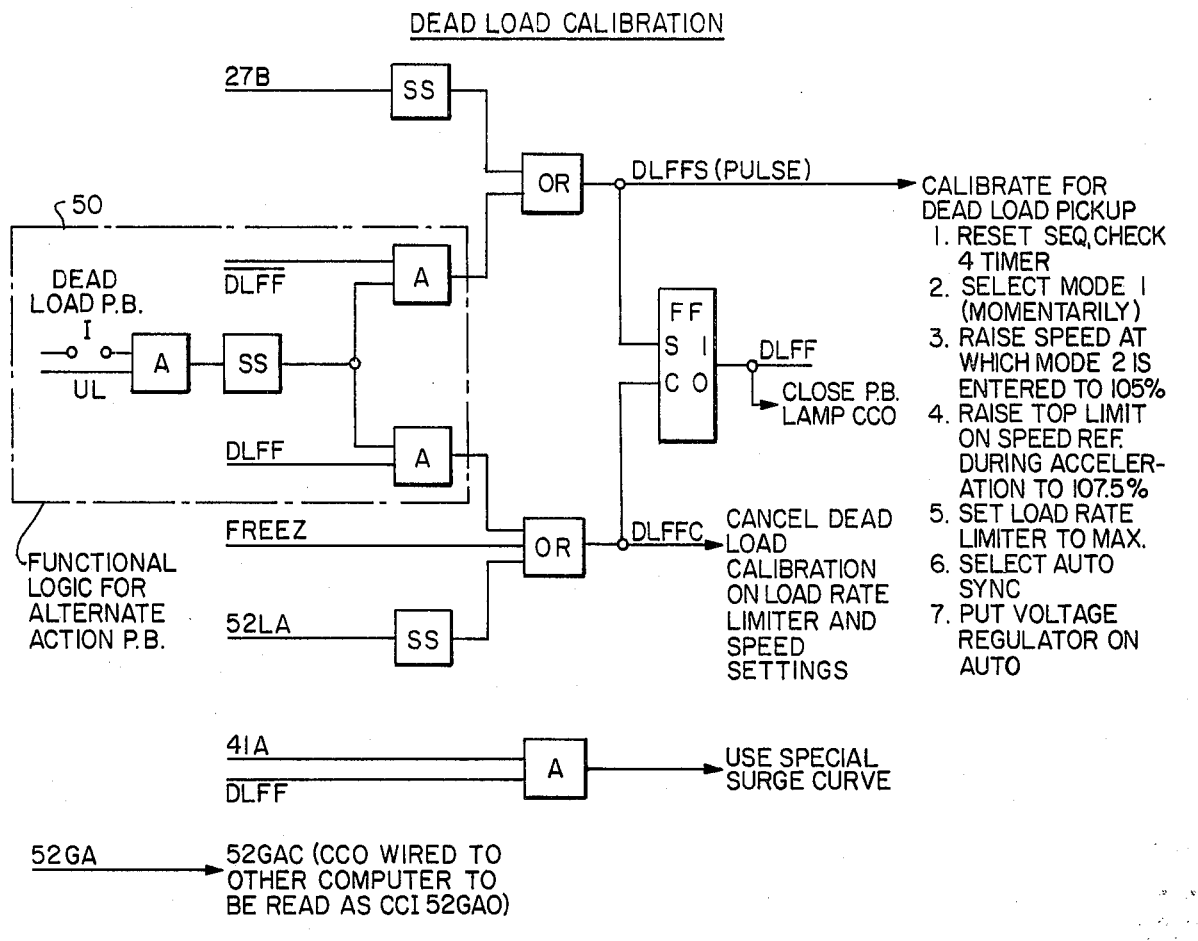
Figure 6B:
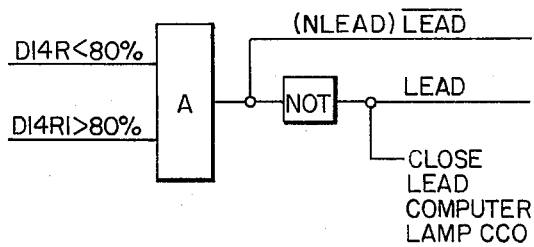
Figure 6B:
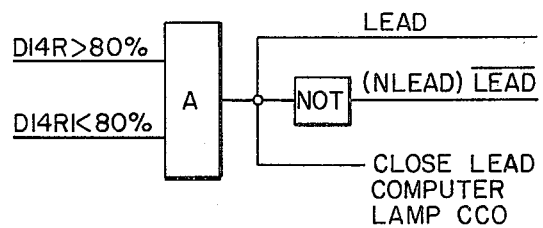
Figure 6C:
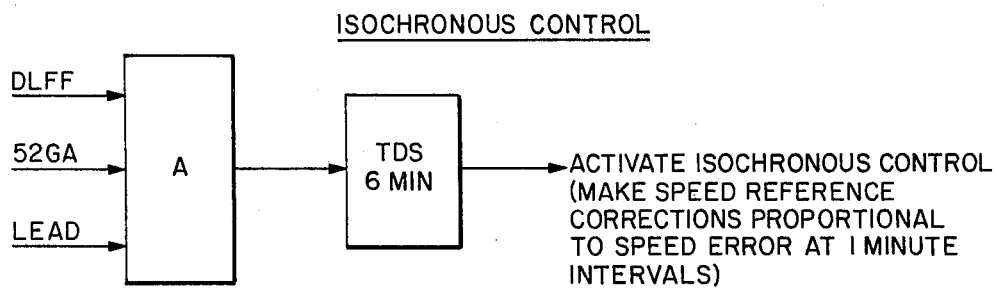
Figure 6D:
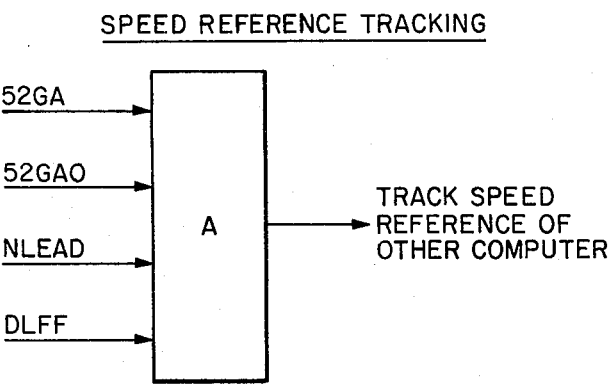
Figure 6E:
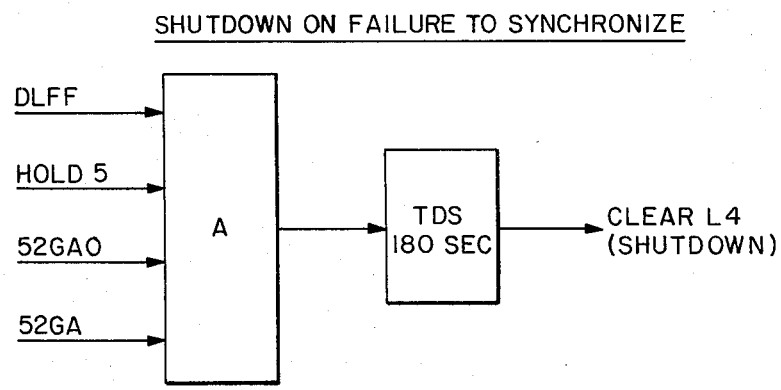

Block 51 of FIG. 4 is detailed in the remainder of FIG. 6A and also in FIG. 6E. When the dead load flip flop whose output is labeled DLFF is set, the system is calibrated for dead load pickup. A list of the items which must be changed for dead load calibration is included in FIG. 6A. When the dead load flip flop is cleared, a lesser number of program changes are required to restore the programs to the normal condition and these changes are also listed in FIG. 6A. The dead load flip flop is set by the dead load pushbutton or by loss of bus voltage indicated by signal 27B. Signal 27B also triggers an automatic turbine start. The dead load flip flop can be cleared by another pushbutton operation, closure of the line breaker 16 (signal 52LA) or by a signal called FREEZ which occurs on every turbine shutdown. FIG. 6A also shows that a special surge curve described previously herein is used on dead load calibration after the field breaker closes automatically at a nominal 92% speed.

Another detail shown in FIG. 6A indicates a computer contact is programmed to follow the position of the generator breaker and this contact is wired to the other computer so that each computer knows the position of the other computer's generator breaker.

FIG. 6E further details block 51 of FIG. 4. This logic indicates that under dead load mode control, if the other generator breaker closes and three minutes elapses and the generator breaker associated with this computer fails to close, the turbine is shut back down. (Master control L4 is cleared). This timer can be blocked by the $\overline{\text{HOLD5}}$ signal which is one of the standard operator selected sequence hold points holding the sequence short of synchronizing.

With reference to FIG. 6B, the Lead Computer Determination logic has been previously described herein Block 68 of FIG. 4 is further detailed in FIG. 6C which relates to Isochronous Control. If the dead load flip flop is set and the generator breaker is closed and this is the lead unit, a six-minute time delay is activated which allows the customer's sectionalized load to be applied. At the end of the time delay and at one minute intervals thereafter, the speed reference is changed an amount proportional to the difference between actual speed and synchronous speed giving, in effect, reset action to hold the speed within a small deadband around synchronous speed under normal load change conditions. In conjunction with isochronous control, FIG. 6D further details the speed tracking control block 70 of FIG. 4. This indicates that if the dead load flip flop is set, and this is not the lead unit and that both generator breakers are closed, this unit's speed reference is set to match the other unit's speed reference to allow load sharing with the lead unit.

Figure 7:
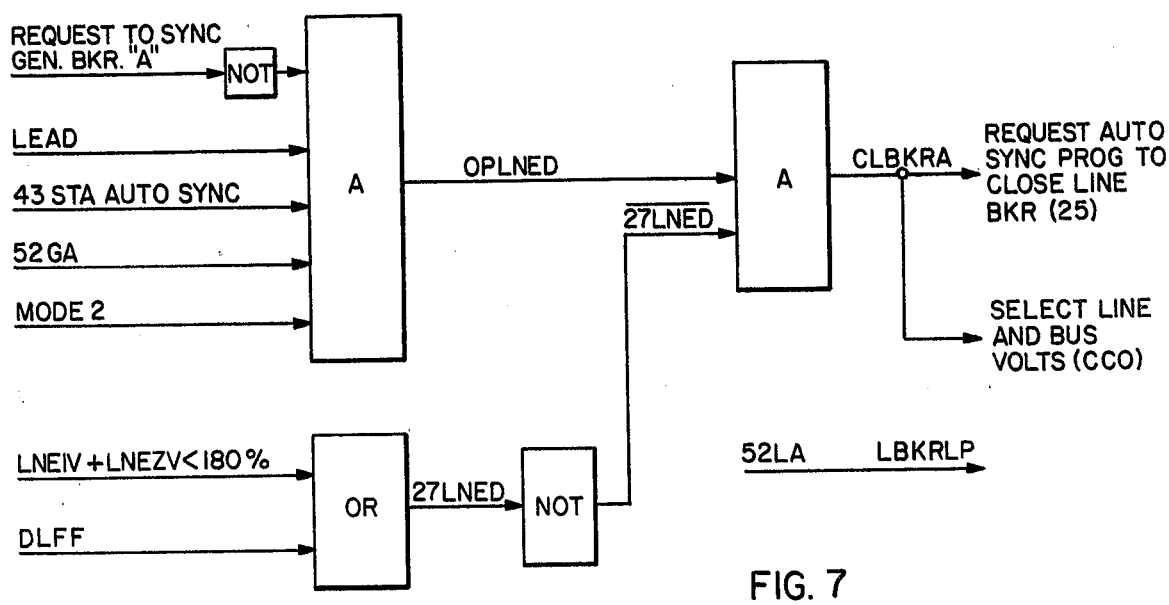
FIGS. 6A–6E and 7 show various logic blocks employed in the system of FIG. 4.

Finally, FIG. 7 details the line breaker closing logic if provided. The usual provisions for manual close and trip of the line breaker from the turbine operator's console is omitted, with only automatic line breaker synchronizing and line breaker position indication being retained in this particular system. Further, the program uses the loading temperature curves during line breaker synchronizing rather than the usual starting temperature curves since line breaker synchronizing may occur with full load on the turbine. To initiate line breaker synchronizing, several conditions must be met:

1. The generator breaker must not be being synchronized.
2. This computer must be the lead computer at the time.
3. Automatic synchronizing must have been selected.
4. The generator breaker must be closed.
5. The control must be in mode 2, the synchronizing mode.
6. The line must be live (2 independent voltage measurements must average above 90% voltage) and the dead load mode must not be selected.

If the generator breaker is automatically synchronized and the above conditions are met, the control stays in the synchronizing mode and proceeds to synchronize the line breaker. If the line becomes reenergized after a dead load pickup, the control can be requested to synchronize the line breaker by using the dead load pushbutton to clear the dead load flip flop and control mode 2, the synchronizing mode, can be reentered by pressing one of the start pushbuttons.

Figure 8A:
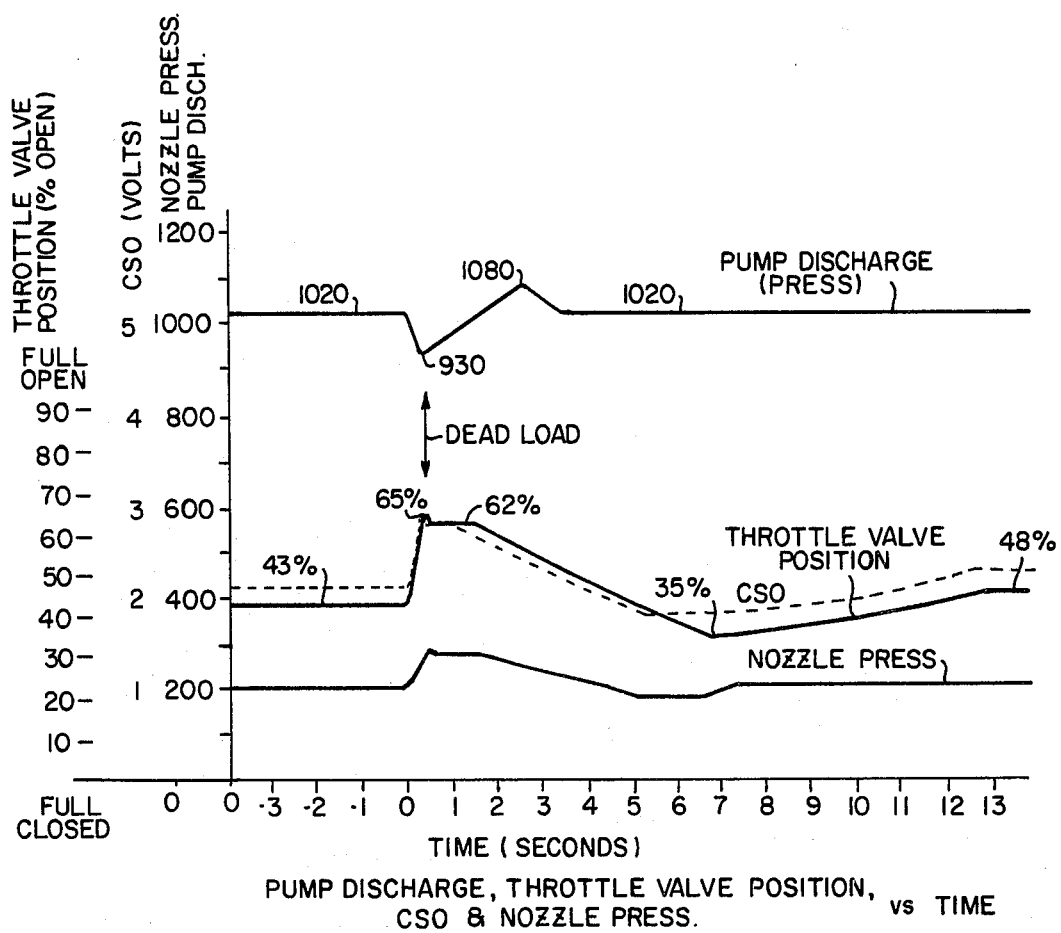
FIGS. 8A and 8B show certain turbine performance curves during dead load pickup operation.
Figure 8B:
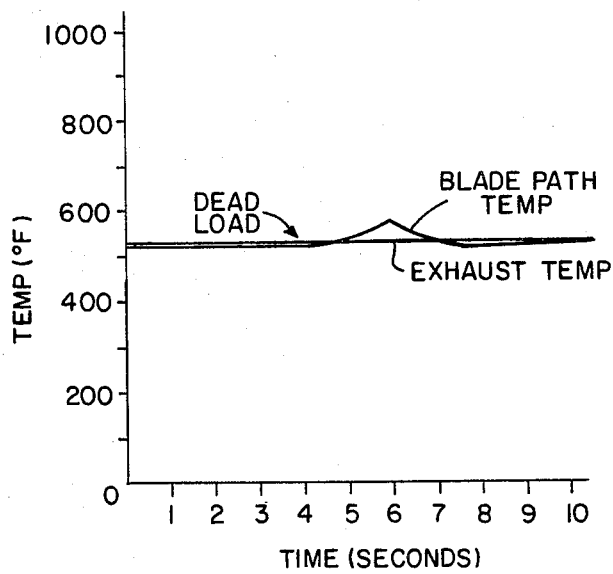

In FIGS. 8A and 8B there are shown graphs which illustrate the performance of a single turbine on a dead load pickup. FIG. 8A shows the response of the throttle valve and pump discharge and nozzle fuel pressures to a dead load pickup. FIG. 8B shows the delayed response of the exhaust control thermocouples in relationship to the blade path temperature. The time delays, inherent in the cycle temperature measuring ability during the transient pickup of several seconds duration, point to the need for the described means for limiting load and otherwise associated destructive fuel excursions.

Appendix

In this appendix there are included program listings for priority and other logic controls, isochronous control and other functions employed in the implementation of the invention.

Changes in standard WETAC programming:
1. Replace GASPR analog input with SPREF from other turbine

| (Index 301) | | |
|---|---|---|
| (24140) = 35032 | | Process Word 2 |

Connect H/S 56 J15(+), J16(−1) of each computer to H/S 0053 K03(+), K04(−) of other computer.

2. Since transducer inputs are switched, restore voltage and frequency selection programs and insert correct voltage correction ratio.

| (6150) = 32356 | ENL (LNEFREQ) |
| (6151) − 11052 | SUB TNUMBR |
| (23450) = 751 | DEC .956B9 RATIO |
| (23566) = 24627 | OCT BUSIV |
| (23557) = 24637 | OCT GENIV |
| (23740) = 24345 | JMP REGLR 23741-23745 Free |
| (23672) = 24300 | JMP NφRMAL |
| (23675) = 24300 | JMP NφRMAL 23676-23701 Free |

3. Skip program setting gas pressure normal lamp so it can be used to indicate LEAD computer.

| (15240) = 24240 | JMP L + 1 |

4. Determine LEAD computer. Go to LEAD logic before going to ABVARI.

| (14334) = 7757 | OCT 7760 Save 12KV comparison. |

| (10201) = 32622 | LDLOG | ENL D14R | (10201) = 32322 | LDLφG | ENL 80PCT |
| (10202) = 11221 | | SUB 80 PCT) | (10202) = 11621 | | SUB D14R |
| (10203) = 37215 | | STL NLEAD | (10203) = 37614 | | STL LEADA I |
| (10204) = 3221 | | ENL 80PCT) | (10204) = 32620 | | ENL D14R1 |
| (10205) = 11620 | | SUB D14R1 | (10205) = 11222 | | SUB 80PCT) |
| (10206) = 12215 | | AND NLEAD | (10206) = 12614 | | AND LEADA, I |
| (10207) = 37215 | | STL NLEAD | (10207) = 37614 | | STL LEADA, I |
| (10210) = 13207 | | EφR L−1 | (10210) = 37617 | | STL LEADLP |
| (10211) = 37614 | | STL LEADA, I | (10211) = 13210 | | EφR L−1 |
| (10212) = 37617 | | STL LEADLP | (10212) = 37215 | | STL NLEAD |
| (10213) = 24616 | 8 | JMP ABVARI | (10213) = 24616 | 8 | JMP ABVARI |
| (10214) = 11272 | LEADA | OCT LEAD (FREQWN) | (10214) = 11272 | LEADA | OCT LEAD (FREQWN) |
| (10215) = 0 | NLEAD | OCT | (10215) = 0 | NLEAD | OCT |
| (10216) = 7677 | | WRD ABVARI−1 | (10216) = 7677 | | WRD ABVARI−1 |
| (10217) = 11576 | | WRD ABVARI−1 | (10216) = 7677 | | WRD ABVARI−1 |
| (10220) = 24701 | | WRD D14R1 | (10220) = 24701 | | WRD D14R |
| (10221) = 5162 | | WRD 80 PCT) | (10221) = 11720 | | WRD D14R |
| (10222) = 11720 | | WRD D14R | (10222) = 5162 | | WRD 80PCT) |

5. Incorporate LEAD status into logic associated with closing 52G onto a dead bus. Also read other bkr's position.

| (7706) = 30006 | INT 6 - other bkr position 52GAφ |
| (7675) = 4000 | φ4000 OCT 4000 CCI bit 11 mask. |
| (7716) = 10215 | OCT NLEAD Exec. As instruction |
| (7717) = 16716 | RSH NLEAD |
| (7720) = 27321 | PJP L + 2 |

6. Substitute being lead computer as being prerequisite to auto-synchronizing line bkr for requirement that the "B" turbine generator breaker is not being synchronized.

| (15020) = 10215 | OCT NLEAD |

7. Skip frequency checks. Use space to clear line sync on-off flip-flop when computer is not lead computer. Make CCφ wired to other computer (52GAC) follow 52GA as read in original CCI scan.

| (15024) = 32430 | | ENL 52GA | |
| (15025) = 37427 | | STL 52GAC | |
| (15026) = 24031 | | 8JMP 15032 | |
| (15027) = 11610 | | OCT 52GAC CCφ | |
| (15030) = 11440 | | OCT 52GA CCI | |
| (15031) = 0 | | | |
| (15032) = 32725 | | ENL TMP1 | |
| (23761) = 0 | BLK818 | ... | |
| (23762) = 16673 | | RSH NLEAD,I | Clear line sync flip-flop. If this is not lead computer. |
| (23763) = 27365 | | PJP L + 3 | |
| (23764) = 02770 | | CMB SSL | |
| (23765) = 02767 | | CMB SSLBIT | |
| (23766) = 24761 | | RTN | |
| (23767) = 10125 | | WRD SSLBIT | Resident |

-continued

| | | | |
|---|---|---|---|
| (23770) = 11327 | | WRD SSL | Table Master Table |
| (23673) = 10215 | NLEADA | OCT NLEAD | |

8. Dead bus and line breaker open is represented by 1 contact (27GB) or (27B) (from VEPCO Special alarms).

| | | |
|---|---|---|
| (14105) = 32507 | | ENL L + 2,I |
| (14106) = 24107 | | JMP L + 2 |
| (14107) = 11470 | | OCT 11470 27GB CHAN 13 BIT 4 |
| (14077) = 32507 | | 8ENL 14107,I 27GB |

Dead Load Pickup Changes

| | | |
|---|---|---|
| (33502) = 32271 | ENL 12444) | Activate keeping speed reference up after picking up load. Let isochronous control bring it down. |

10. If unit is on dead load calibration and sync hold has not been selected and 52G does not close soon enough after the other generator breaker closes, unit will shut back down. Also, block ability to trip line breaker.

| | | |
|---|---|---|
| (15065) = 02736 | | CMB 52LT |
| (15066) = 32430 | | ENL 52GA |
| (15067) = 13066 | | E$\phi$R L−1 |
| (15070) = 12104 | | AND 52GA$\phi$CCI |
| (15071) = 12503 | | AND NHOLD5 |
| (15072) = 12502 | | AND DLFF |
| (15073) = 36501 | | RJP TDLSEC |
| (15074) = 15222 | | OCT DLDLY |
| (15075) = 27076 | | PJP L+2 |
| (15076) = 02500 | | CMB L4 |
| (15077) = 24227 | | 8JMP 15230 |
| (15100) = 11221 | | WRD L4 |
| (15101) = 36415 | | WRD TDLSEC |
| (15102) = 33554 | | WRD DLFF |
| (15103) = 11260 | | WRD NHOLD5 |
| (15104) = 0 | 52GA$\phi$ | OCT other 52G status |
| (15221) = 226 | | OCT 226 |
| (15222) = 226 | DLDLY | OCT 221 DELAY 3 MIN. DELAY |

11. Cancel dead load pickup calibration when 52L closes. Modify auto start option. Use remote ASR option space.

| | | |
|---|---|---|
| (16576) = 37661 | | OCT 52LPCH−1 |
| (37662) = 32272 | 52LPCH | ENL 52LSAV |
| (37663) = 13262 | | EOR L−1 |
| (37664) = 12675 | | AND 52LA |
| (37665) = 27266 | | PJP L+2 |
| (37666) = 36674 | | RJP CANCDL |
| (37667) = 32675 | | ENL 52LA |
| (37570) = 37272 | | STL 52LSAV |
| (37671) = 24673 | | 8JMP 12457 |
| (37672) = 0 | 52LSAV | OCT |
| (37673) = 12456 | | WRD 12457−1 |
| (37674) = 33525 | | WRD CANCDL |
| (37675) = 11443 | | WRD 52LA |

12. Block B alarm program which clears locations 10230-10237.

| | | |
|---|---|---|
| (22225) = 24225 | | JMP L + 1 |

13. Reduce max. speed on dead load start

| | | |
|---|---|---|
| (33671) = 12221 | 5265RPM−107% | (was 12444, 5412 RPM) |
| (33717) = 310 | +6% | (was 454, +9%) |
| (33715) = 12252 | 107.5% | (was 12444, 5412 RPM) |

14. Extend sequence 4 timer to 5 minutes

| | |
|---|---|
| (10025) = 372 | DEC 5 * 5 * 60/6 |
| (10026) = 372 | DEC 5 * 5 * 60/6 |

15. Provide 2 ignition attempts

| | |
|---|---|
| (13762) = 2 | OCT 2 |
| (10063) = 2 | OCT 2 |

16. Add DLFF (dead load flip-flop) to dead line check to block line breaker closing on dead load calibration.

| | | |
|---|---|---|
| (23641) = 24000 | | JMP PATCH D |
| (23400) = 36406 | | WRD IORSUB |
| (23401) = 36400 | PATCH D | RJP IORSUB |
| (23402) = 33554 | | OCT DLFF |
| (23403) = 0 | | OCT 0 |
| (23404) = 24644 | | 8JMP 12427 |

17. Correct normal leveling speed to latest value.

| | | |
|---|---|---|
| (33716) = 11672 | 102.8% | SPEED REF |

18. Reduce criteria to close on a dead bus from 13 V to 12 KV (field flashing may be low). (14116)=6310

19. Block manual synchronizing of line breaker by having line breaker sync. on switch, calling line breaker off switch program.

| | |
|---|---|
| (34710) = 10575 | OCT PB23−1 |

20. Change line breaker sync. program in area triggering resynchronizing with start request STRQ.

| | |
|---|---|
| (23735) = 24336 | JMP L+2 |

21. Block normal start from supervisory control unless BUS 2 V is greater than 13 KV.

| | | |
|---|---|---|
| (34302) = 46 | | |
| (34732) = 10602 | | OCT PB46−1 |
| (10603) = 32211 | PB46 | ENL 13KV) |
| (10604) = 11610 | | SUB BUS2V |
| (10605) = 27636 | | PJP EXITF |
| (10606) = 24607 | | 8JMP 35523 |
| (10607) = 35522 | | WRD 35523−1 |
| (10610) = 24631 | | WRD BUS2V |
| (10611) = 6731 | | WRD 13KV) |

22. Initialize isochronous timer at 6 minutes

| | | | |
|---|---|---|---|
| (33555) = 454 | IISCNT | DEC300 (6 minutes) | |

23. Read and store other 52G's position.

| | | |
|---|---|---|
| (15003) = 24003 | JMP L+1 | |
| (15004) = 30006 | INT 6 | |
| (15005) = 37104 | STL 52GAO | |
| (15006) = 14104 | LSH 52GAO | |
| (15007) = 14104 | LSH 52GAO | |
| (15010) = 02753 | CMB 52LT | |
| (15011) = 24011 | JMP L+1 | |

24. Correct 2 min. shutdown timer patch

| | | |
|---|---|---|
| (15073) = 36501 | RJP TDLSEC | |

25. Raise top limit on speed ref. during dead load acceleration.

| | | |
|---|---|---|
| (33715) = 12252 | OCT 12252 107.5% | |

26. Don't keep NO program in control of speed response during synchronizing.

| | | |
|---|---|---|
| (33501) = 24101 | JMP L+1 | |

27. In Mode 2, use base load temperature curve. Put patch in supv. control space.

| | | | |
|---|---|---|---|---|
| 31122 | 32764 | | ENL PRES2C | |
| 31123 | 37763 | | STL VARINI | |
| 31124 | 32326 | | ENL NORMST + NUMPTS−1) | |
| 31125 | 24526 | | JMP L+1,I | |
| 31126 | 37577 | | OCT MOD2CH−1 | |
| 37600 | 16606 | MOD2CH | RSH MODE2 | |
| 37601 | 27202 | | PJP L+2 | |
| 37602 | 32205 | | ENL BASELD + NUMPTS − 1) | |
| 37603 | 24604 | | 8JMP 31127 | |
| 37604 | 31126 | | WRD 31127−1 | |
| 37605 | 30570 | | WRD BASELD + NUMPTS − 1) | |
| 37606 | 30403 | | WRD MODE2 | |

28. Reprogram patch where 1 computer tracks other computer's speed reference.

| | | | | |
|---|---|---|---|---|
| 10223 | 30006 | TRKPCH | INT 6 | READ 52GAO |
| 10224 | 14650 | | LSH ACC | |
| 10225 | 14650 | | LSH ACC | |
| 10226 | 12647 | | AND 52GA | |
| 10227 | 12215 | | AND NLEAD | |
| 10230 | 12646 | | AND DLFF | |
| 10231 | 27237 | | PJP CONT | |
| 10232 | 32645 | | ENL D14R1 | RPM = 3/2 ADC |
| 10233 | 16650 | | RSH ACC | |
| 10234 | 10645 | | ADD D14R1 | |
| 10235 | 24235 | | JMP L+1 | |
| 10236 | 37644 | | STL M4LMIT | |
| 10237 | 24643 | | JMP BD26JP | |
| 10240 | 16647 | Cont | RSH 52GA | Wiped out instruction. |
| 10241 | 24642 | | 8JMP 33573 | |
| 10242 | 33572 | | WRD 33573−1 | |
| 10243 | 12335 | | WRD BD26JP−1 | |
| 10244 | 33254 | | WRD M4LMIT | |
| 10245 | 24701 | | WRD D14R1 | |
| 10246 | 33554 | | WRD DLFF | |
| 10247 | 11440 | | WRD 52GA | |

-continued

| | | | |
|---|---|---|---|
| 10250 | 101 | | WRD ACC |

29. Skip patch on line breaker tape.

| | | | |
|---|---|---|---|
| 31024 | 32753 | | ENL TNUMBR |
| 31353 | 30653 | | WRD TNUMBR |

30. Fix time delay program that shuts down slave turbine if it doesn't sync. soon enough after lead unit's closed end bus.

| | | | |
|---|---|---|---|
| 15075 | 27076 | | PJP L+1 |
| 15103 | 11260 | | WRD NHOLD5 |

31. Extend this time to 3 minutes.

| | | | |
|---|---|---|---|
| 15221 | 226 | | DEC 3 * 50 * 5/6 |
| 15222 | 226 | | DEC 3 * 50 * 5/6 |

32. Save 12 KV Gen. volt comparison before going to lead logic.

| | | | | |
|---|---|---|---|---|
| (14334) = 7757 | | | WRD | 12KVSV−1 |
| (7760) = 37756 | 12KV5V | | STL | TMP2 |
| (7761) = 24762 | | | JMP | L+1,I |
| (7762) = 10200 | | | OCT | LDLOG−1 |
| (7700) = 24300 | ASVARI | | JMP | L+1 |
| 10/23/75 — Fix Track Patch | | | | |
| 10233 | 16650 | | RSH | ACC |
| 10234 | 10645 | | ADD | D14R1 |
| 10235 | 24235 | | JMP | L+1 |

251 Black Plant Auto Start

Using single shot action, select base load and trigger normal start on initial closing of 27B (81B at Alabama) single shot action permits manual shutdown even though contact 27B stays closed.

Use core space associated with loss of starting motor.

Shorten normal start evaluation and jump to 27B check.

| | | | | |
|---|---|---|---|---|
| (12452) = 0 | | | OCT | 0 |
| (12453) = 37744 | | | STL | NORMST |
| (12454) = 24455 | | | JMP | L+1,I |
| (12455) = 16563 | | | OCT | 27BCKK−1 |
| (12456) = 0 | | | Free | |
| (12457) = 032743 | | | −ENL | EMGSRT |
| 32744 | | | ENL | NORMST |
| Kitty Hawk | | | | |
| (16563) = 24211 | | | JMP | LABL25 |
| (16564) = 32713 | 27BCHK | | ENL | STTSAV (Use old DSLBKR) |
| (16565) = 13351 | | | EOR | −0) |
| (16566) = 12602 | | | AND | 27B (81B for Alabama) |
| (16567) = 27172 | 24172 to block auto start | | PJP | L+4 |
| (16570) = 03601 | | | SMB | NORMST |
| (16571) = 03600 | | | SMB | 43LSB |
| (16572) = 24172 | 36577− | | JMP | L+1 Spare for dead load |
| Kitty Hawk | | | | |
| (16573) = 32602 | | | ENL | 27B (81B for Alabama) |
| (16574) = 37713 | | | STL | STTSAV |
| (16575) = 24576 | | | 8JMP | 12457 |
| (16576) = 12456 | | | WRD | 12457−1 |
| (16577) = 33456 | | | WRD | DLP-SPARE |

| | | | FOR DEAD LOAD (DLP) |
|---|---|---|---|
| (16600) = 11324 | | WRD | 43LSB |
| (16601) = 11125 | | WRD | NORMST |
| (16602) = 11470 | 11467 for' Alabama | WRD | 27B (81B for Alabama) |

* If dead load pickup option is furnished as at Delmarva and Kittyhawk (Not for Alabama).

| (16572) = 36577 | | RJP | DLP |
|---|---|---|---|
| (12457) = 32744 | | ENL | NORSRT |

What is claimed is:

1. A system for supplying power to a dead load bus comprising a first gas turbine-generator unit and at least a second gas turbine generator unit, a first generator breaker connected between said first unit and a plant auxiliary bus and a second generator breaker connected between said second unit and the auxiliary bus, first fuel control means for controlling the speed of said first unit and second fuel control means for controlling the speed of said second unit, first and second means for closing said first and second generator breakers, means for generating a dead load mode select signal, means for operating said first and second fuel control means and said first and second breaker control means in response to a dead load mode select signal to accelerate said units simultaneously to a higher than normal speed condition and to close one of the breakers to the auxiliary bus and then sequentially operate the other unit to synchronize the other breaker to the auxiliary bus, said operating means including logic means for selecting one of said units as the lead unit and for shifting the lead between said units under predetermined conditions, and the first generator breaker closed being the breaker associated with the lead unit, means for connecting the auxiliary bus to the dead load bus after the generator units have been synchronized with each other, and means for operating said fuel control means to control the frequency of power generation and to provide for load sharing between said units during and after the dead load transient.

2. A system as set forth in claim 1 wherein means are provided for sensing the speed of each turbine and the status of each generator breaker, and digital computer means responds to said sensing means in logically generating the lead unit determination dynamically as the turbine generator units are simultaneously brought to the overspeed state prior to dead load pickup.

3. A system as set forth in claim 1 wherein said frequency control means includes an isochronous speed control which operates the fuel control means for the lead unit, and tracking means for operating the other fuel control means in correspondence to the operation of the lead fuel control means.

4. A system as set forth in claim 1 wherein one of said units is designated as the preferred unit, said logic means includes means for generating a speed setpoint and for sensing the speed of each unit and means for shifting the lead to the nonpreferred unit if its speed or speed setpoint exceeds a predetermined value while the preferred unit speed or speed setpoint is below the predetermined value.

5. A system as set forth in claim 4 wherein said logic means includes means for shifting the lead back to the preferred unit if its speed or speed setpoint reaches the predetermined value and the nonpreferred unit fails to close its generator breaker.

6. A system as set forth in claim 4 wherein said logic means includes means for shifting the lead back to the preferred unit after closure of the nonpreferred unit generator breaker and synchronization of the preferred unit generator breaker.

7. A system as set forth in claim 1 wherein digital computer means is employed to operate both of said fuel control means as described in response to speed signals for both turbines and status signals for both generator breakers and the dead load mode select signal.

8. A system as set forth in claim 2 wherein means are provided for generating the dead load mode select signal when as associated line breaker opens in response to a loss of voltage in a system line, and said logic means is selectively operative to operate the fuel control means for one of said units in synchronizing the line breaker to said system line when said system line has been reestablished.

9. A system as set forth in claim 2 wherein said operating means includes means for generating a speed reference and an actual turbine speed signal for application to each of said fuel control means, and means for tracking the speed reference for the follow unit to the speed reference for the lead unit after both generator breakers are closed.

10. A control system for a dead load pickup plant having a first gas turbine-generator unit and at least a second gas turbine generator unit, a first generator breaker connected between said first unit and a plant auxiliary bus and a second generator breaker connected between said second unit and the auxiliary bus, said control system comprising first fuel control means for controlling the speed of said first unit and second fuel control means for controlling the speed of said second unit, first and second means for closing said first and second generator breakers, means for generating a dead load mode select signal, means for operating said first and second fuel control means and said first and second breaker closing means in response to a dead load mode select signal to accelerate said units simultaneously to a higher than normal speed condition and to close one of the generator breakers to the auxiliary bus and then sequentially operate the other unit to synchronize the other generator breaker to the auxiliary bus, and means for connecting the auxiliary bus to the dead load bus after the generator units have been synchronized with each other, and means for operating said fuel control means to control the frequency of power generation and to provide for load sharing between said units during and after the dead load transient.

11. A control system as set forth in claim 10 wherein said operating means includes logic means for selecting one of said units as the lead unit and for shifting the lead between said units under predetermined conditions, and the first generator breaker closed is the breaker associated with the lead unit.

12. A control system as set forth in claim 11 wherein said frequency control means includes an isochronous speed control which operates the fuel control means for the lead unit, and tracking means for operating the other fuel control means in correspondence to the operation of the lead fuel control means.

* * * * *